(12) United States Patent
Takahashi

(10) Patent No.: US 7,466,351 B2
(45) Date of Patent: Dec. 16, 2008

(54) INFORMATION PROCESSING METHOD, APPARATUS, PROGRAM AND STORAGE MEDIUM STORING SAID PROGRAM FOR DIGITAL IMAGE DATA GENERATED FROM AN IMAGE SENSING DEVICE

(75) Inventor: Kenji Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/804,334

(22) Filed: Mar. 18, 2004

(65) Prior Publication Data
US 2004/0227824 A1 Nov. 18, 2004

(30) Foreign Application Priority Data
Mar. 20, 2003 (JP) ............... 2003-078374

(51) Int. Cl.
*H04N 9/68* (2006.01)
(52) U.S. Cl. ............... 348/234; 348/221.1; 348/231.6; 382/232
(58) Field of Classification Search ............. 348/222.1, 348/231.6, 232; 382/232
See application file for complete search history.

(56) References Cited

U.S. PATENT DOCUMENTS

| | | | | |
|---|---|---|---|---|
| 5,528,293 A * | 6/1996 | Watanabe | ............... | 348/231.2 |
| 5,719,624 A | 2/1998 | Sasaki et al. | | |
| 5,845,010 A * | 12/1998 | Silverbrook et al. | ........ | 382/232 |
| 6,515,698 B1 | 2/2003 | Sasaki et al. | | |
| 6,657,655 B1 * | 12/2003 | Iizuka et al. | ............... | 348/47 |
| 6,816,193 B1 * | 11/2004 | Kohashi et al. | ............ | 348/234 |
| 6,819,360 B1 * | 11/2004 | Ide et al. | ............. | 348/340 |
| 6,873,341 B1 * | 3/2005 | Adams et al. | ............... | 345/629 |
| 7,200,265 B2 * | 4/2007 | Imai | ............. | 382/168 |
| 2002/0054207 A1 * | 5/2002 | Iizuka et al. | ............... | 348/54 |
| 2002/0061142 A1 * | 5/2002 | Hiramatsu | ............... | 382/254 |
| 2002/0140825 A1 * | 10/2002 | Terashita | ............. | 348/222.1 |

FOREIGN PATENT DOCUMENTS

| | | | |
|---|---|---|---|
| EP | 1271404 A2 * | 1/2003 | |
| JP | 63-281595 | 11/1988 | |
| JP | 3-38986 | 2/1991 | |
| JP | 3-49483 | 3/1991 | |
| JP | 3-50984 | 3/1991 | |
| JP | 6-90435 | 3/1994 | |

(Continued)

*Primary Examiner*—David L Ometz
*Assistant Examiner*—Usman Khan
(74) *Attorney, Agent, or Firm*—Morgan & Finnegan, LLP

(57) ABSTRACT

An information processing method for processing a file containing reversibly compressed or non-compressed digital image data obtained by digitally converting a signal that has been output from an image sensing device makes it possible to execute selectively signal processing of a plurality of types by using any of at least a plurality of types of luminance signal generating processing methods and/or a plurality of types of color signal generating processing methods for converting the digital image data contained in the file to data having a prescribed format. The method includes automatically selecting signal processing to be used from among the plurality of types of signal processing based upon information contained in the file, and causing the selected signal processing to be executed so that the digital image data contained in the file is converted to data having the prescribed format.

7 Claims, 16 Drawing Sheets

FOREIGN PATENT DOCUMENTS

| | | |
|---|---|---|
| JP | 9-98325 | 4/1997 |
| JP | 9-116926 | 5/1997 |
| JP | 11-220687 | 8/1999 |
| JP | 2000-59800 | 2/2000 |
| JP | 2001-223979 | 8/2001 |
| JP | 2002-33994 | 1/2002 |
| JP | 2002-57877 | 2/2002 |
| JP | 2002-330388 A | 11/2002 |
| JP | 2002-369036 | 12/2002 |
| JP | 2003-47023 | 2/2003 |
| JP | 2004-64434 | 2/2004 |

\* cited by examiner

FIG. 4

| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

SINGLE-CHIP PRIMARY-COLOR CCD SIGNAL

FIG. 5

| C | M | C | M | C | M |
|---|---|---|---|---|---|
| Y | G | Y | G | Y | G |
| C | M | C | M | C | M |
| Y | G | Y | G | Y | G |
| C | M | C | M | C | M |
| Y | G | Y | G | Y | G |

SINGLE-CHIP COMPLEMENTARY-COLOR CCD SIGNAL

FIG. 6

| 1/16 | 2/16 | 1/16 |
|---|---|---|
| 2/16 | 4/16 | 2/16 |
| 1/16 | 2/16 | 1/16 |

FIG. 12

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |
| G | G | G | G | G | G |
| G | G | G | G | G | G |
| G | G | G | G | G | G |
| G | G | G | G | G | G |
| G | G | G | G | G | G |
| G | G | G | G | G | G |
| B | B | B | B | B | B |
| B | B | B | B | B | B |
| B | B | B | B | B | B |
| B | B | B | B | B | B |
| B | B | B | B | B | B |
| B | B | B | B | B | B |

3-CHIP RGB SIGNAL DATA

FIG. 15

| | | |
|---|---|---|
| 1/8 | 2/8 | 1/8 |
| 2/8 | 4/8 | 2/8 |
| 1/8 | 2/8 | 1/8 |

INFORMATION PROCESSING METHOD, APPARATUS, PROGRAM AND STORAGE MEDIUM STORING SAID PROGRAM FOR DIGITAL IMAGE DATA GENERATED FROM AN IMAGE SENSING DEVICE

FIELD OF THE INVENTION

This invention relates to a technique for creating (developing) standard-format image data that includes a description of reversibly compressed or non-compressed digital image data (raw data) obtained by digitally converting a signal that is output from an image sensing device.

BACKGROUND OF THE INVENTION

In general, image data that has been obtained by an image sensor having an image sensing device such as a CCD or CMOS is subjected to image processing within the image sensor and is converted (developed) into reversibly compressed or non-compressed standard-format image data such as image data in the TIFF format. The reason for adopting reversibly compressed or non-compressed image data is to put the image data in a form in which the image data that prevailed at the time of capture will not be lost. For example, as indicated by operation 1 in an image sensor 101 shown in FIG. 14, the general practice is for the image sensor itself to execute all of a series of processing operations that include converting (image processing) a signal obtained from an image sensing device such as a CCD to standard image data reproducible by another device and writing this image data to a recording medium. However, in a system of this kind, a user cannot reproduce the image data upon changing image processing parameters such as white balance and gamma conversion after photography.

An expedient for dealing with the above problem is to make it possible for an external device to be supplied with the digital image data (raw data) per se of a CCD signal or the like obtained by an imaging operation. In accordance with this approach, a user is capable of employing a personal computer or the like to create image data upon changing image processing parameters such as white balance and gamma conversion of image data that has been obtained by an image sensor. According to this arrangement, there is an implementation, as indicated by operation 2 in the image sensor 101 of FIG. 14, in which digital image data obtained as a result of imaging is recorded on a recording medium as is, the recording medium is loaded in a personal computer 102 and the digital image data is read out to the personal computer 102 from the recording medium, or the image data is transmitted to the personal computer 102 directly from the image sensor by communication. As a result, the digital image data is subjected to processing (processing corresponding to operation 1) similar to that within the image sensor by software running on the personal computer 102, whereby the image data is converted to standard image data and developed.

However, image development processing, etc., performed by a product A that uses a CCD having a primary-color filter (a primary-color CCD) differs from that performed by a product B that uses a CCD having a complimentary-color filter (a complementary-color CCD). As a consequence, the prior art is such that with the arrangement for implementing operation 2 described above, signal processing software for executing a plurality of types of processing for generating a luminance signal and/or processing for generating a color signal must be selected by the user manually in accordance with each product. In addition, in a case where image data is transferred to a personal computer or the like and the image data is to be processed by the personal computer, the user does not know what signal processing method to apply to the raw data that has been output from the image sensing device, i.e., whether signal processing for a primary-color filter or signal processing for a complementary-color filter should be executed. Hence, there is the possibility that the wrong signal processing will be executed.

SUMMARY OF THE INVENTION

Accordingly, an object of the present invention is to make it possible to apply the appropriate image processing automatically to data that includes reversibly compressed image data or non-compressed image data obtained by digitally converting a signal output from an image sensing device.

According to the present invention, the foregoing object is attained by providing an information processing method for processing a file containing reversibly compressed or non-compressed digital image data obtained by digitally converting a signal that has been output from an image sensing device, the method including process of: converting the digital image data contained in the file to data having a prescribed format by selectively executing a signal processing of a plurality of types by using any of at least a plurality of types of luminance signal generating processing methods and/or a plurality of types of color signal generating processing methods; selecting automatically signal processing to be used from among the plurality of types of signal processing based upon information contained in the file; and causing the conversion to be executed using the signal processing selected in the selecting process so that the digital image data contained in the file is converted to data having the prescribed format.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating pixel data of a primary-color filter CCD;

FIG. 5 is a diagram illustrating pixel data of a complementary-color filter CCD;

FIG. 6 is a diagram illustrating the coefficients of a filter operation for creating a luminance signal from a complementary-color CCD signal;

FIG. 12 is a diagram illustrating pixel data of a 3-chip CCD;

FIG. 15 is a diagram illustrating coefficients in a filter operation for creating a luminance signal from a primary-color CCD signal.

DETAILED DESCRIPTION OF THE PREFERRED EMBODIMENTS

Preferred embodiments of the present invention will now be described in detail in accordance with the accompanying drawings.

First Embodiment

A system according to a first embodiment of the present invention comprises an image sensing apparatus, which has a CCD sensor employing a CCD as an image sensing device, capable of outputting a file that includes CCD raw data (referred to as a "CCD signal" below), and an information processing apparatus capable of processing the CCD signal (file) supplied by the image sensing apparatus. The image sensing device may be a CMOS sensor or a sensing device of the type that separates color by a photoelectric transducer having a multilayer structure.

Figure 1:
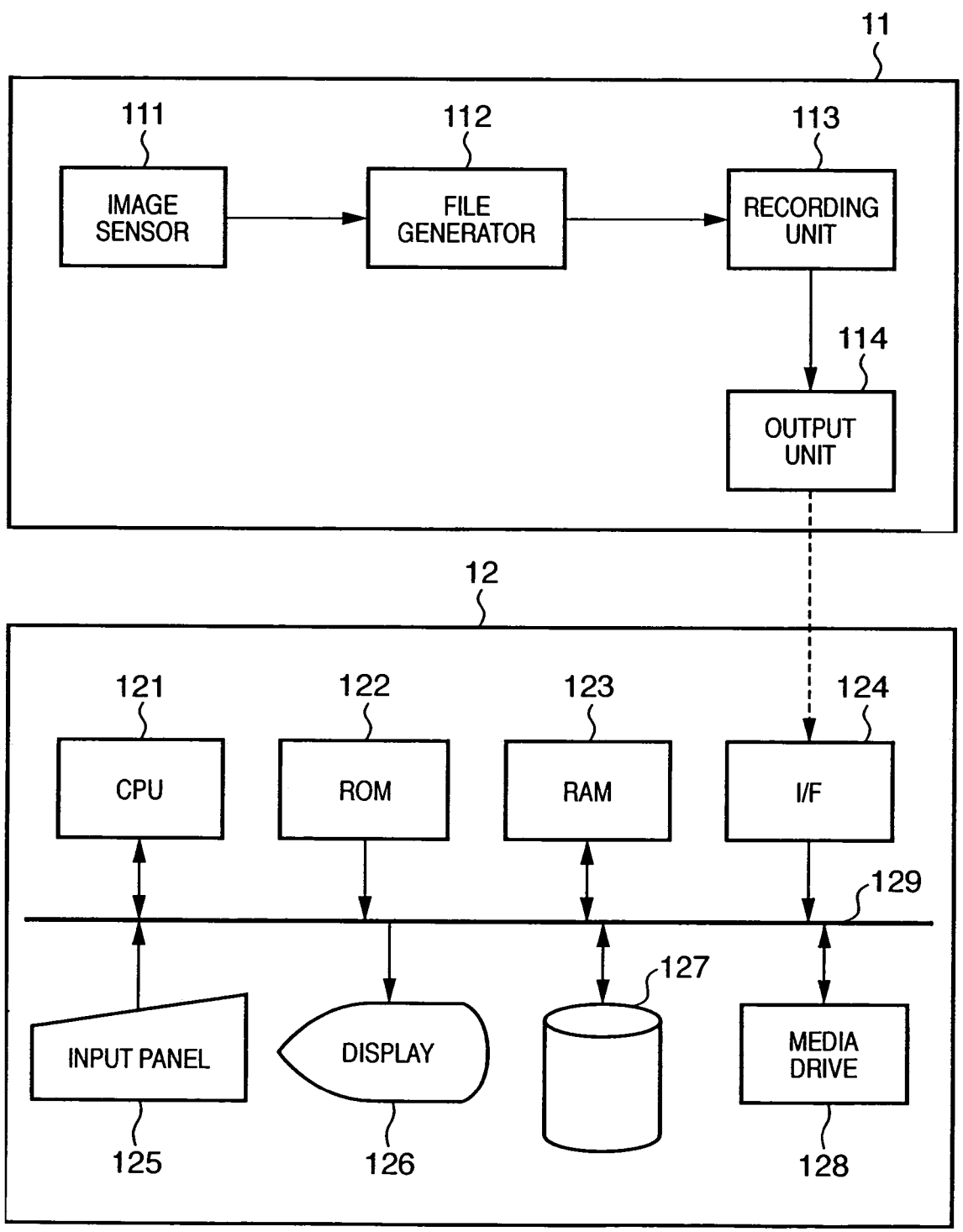
FIG. 1 is a block diagram illustrating the general configuration of an image processing system according to a first embodiment of the present invention.

FIG. 1 is a block diagram illustrating the general configuration of an image processing system according to the first embodiment. The system includes an image sensing apparatus 11 having an image sensor 111, a file generator 112, a recording unit 113 and an output unit 114. The image sensor 111, which has a CCD, applies an analog-to-digital conversion to an image signal obtained from the CCD and then applies non-compressing or reversible compressing processing to the digital signal, thereby outputting the resulting signal as a CCD signal (digital image data). It will suffice if the raw data in this embodiment has an image data format in which the output of an image sensor is recorded so as to be reproducible without loss, such as image data at a stage in which the digital image data obtained by the A/D conversion has not been subjected to image processing such as at least white balance processing, data at a stage in which the A/D-converted digital image data obtained from the image sensing device has not been subjected to color-separation processing for separation into a luminance signal and color signal, or data at a stage in which the output signal of a color filter has not been subjected to color interpolation processing, as in a case where a color filter of a Bayer array or the like is employed.

Figure 7:
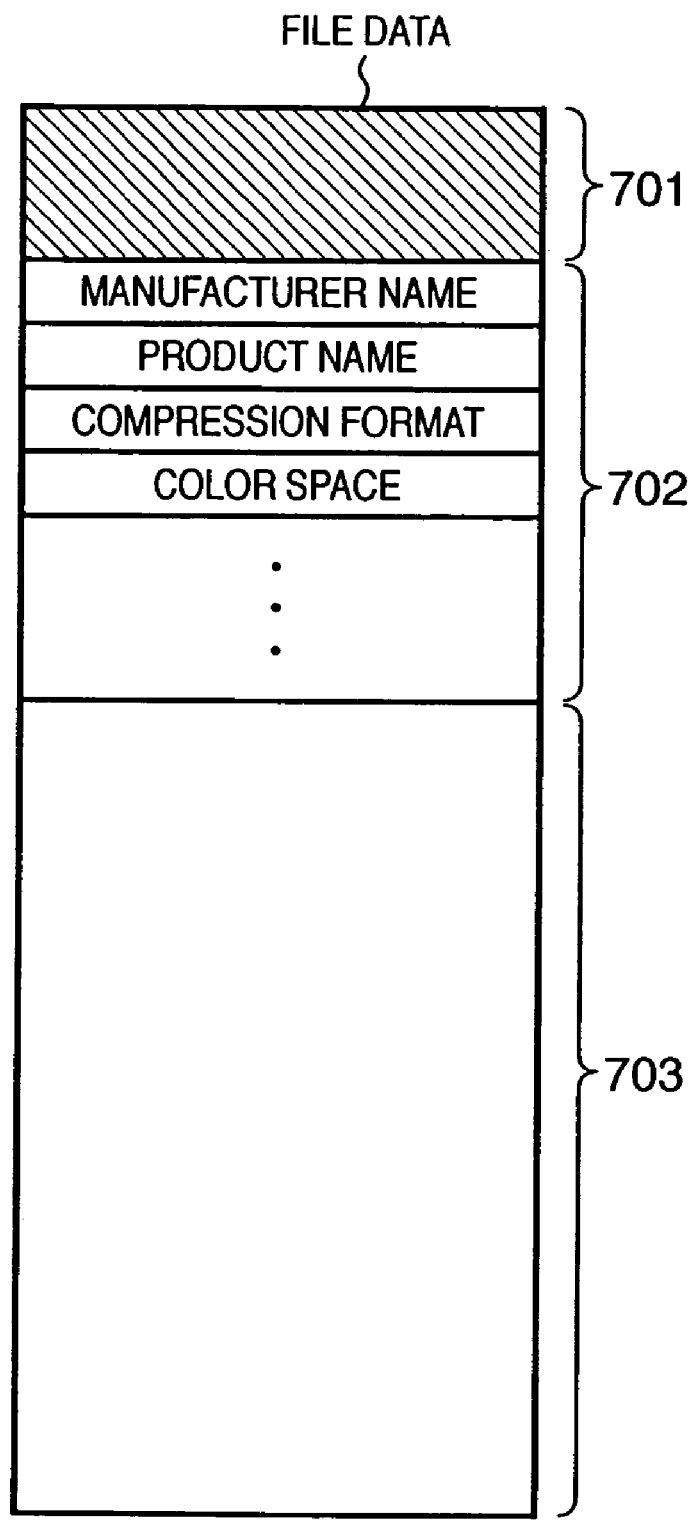
FIG. 7 is a diagram illustrating a file structure according to the first embodiment.
Figure 8:
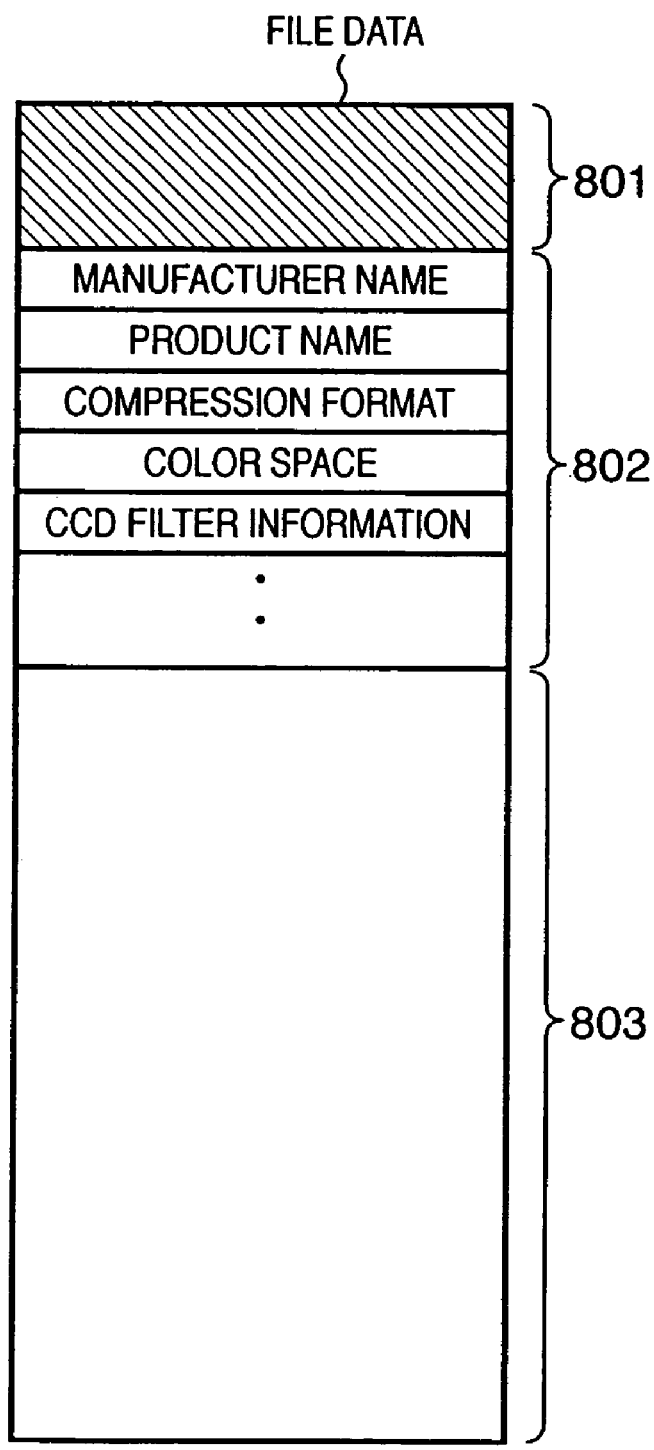
FIG. 8 is a diagram illustrating another file structure according to the first embodiment.

This embodiment assumes use of a complementary-color CCD or primary-color CCD. The file generator 112 generates a file for describing the CCD signal that has been output. The file generator 112 generates a file, which is shown in FIG. 7 or FIG. 8, upon adding on tag information that describes attribute information of the image sensing apparatus, such as the manufacturer name or product name, for specifying the image sensing apparatus. The details of the file structure will be described later with reference to FIG. 7 or FIG. 8. It should be noted that since the tag information is appended individually to each image obtained by sensing, the tag information may contain information relating to the imaging conditions, such as whether or not a flash was fired.

The recording unit 113 records the file generated by the file generator 112 on a prescribed medium. A floppy disk (registered trademark), magneto-optic disc, mini disc, compact disc, compact flash (registered trademark) or smart media (registered trademark), etc., may be used as the medium. The output unit 114 has, e.g., a USB interface and is capable of outputting a file to an external device.

An information processing apparatus 12 includes a CPU 121, a ROM 122, a RAM 123, an interface 124, an input panel 125, a display unit 126, an external storage device 127, a media drive 128 and a bus 129 for connecting these components.

The CPU 121 executes a control program, which has been stored in the ROM 122 or RAM 123, thereby executing various processing inclusive of image processing described later. The interface 124 is an interface for performing communication with an external device. A USB interface, for example, may be used as the interface 124. In this embodiment, a file is received from the image sensing apparatus 11 via the interface 124. The input panel 125, which includes a pointing device and a keyboard, etc., accepts operating commands from the user. The display unit 126 presents various displays under the control of the CPU 121. The external storage device 127 stores various application programs and data. In general, a hard disk is employed as the external storage device 127. The media drive 128 controls data communication between a prescribed recording medium and the bus 129.

Figure 13:
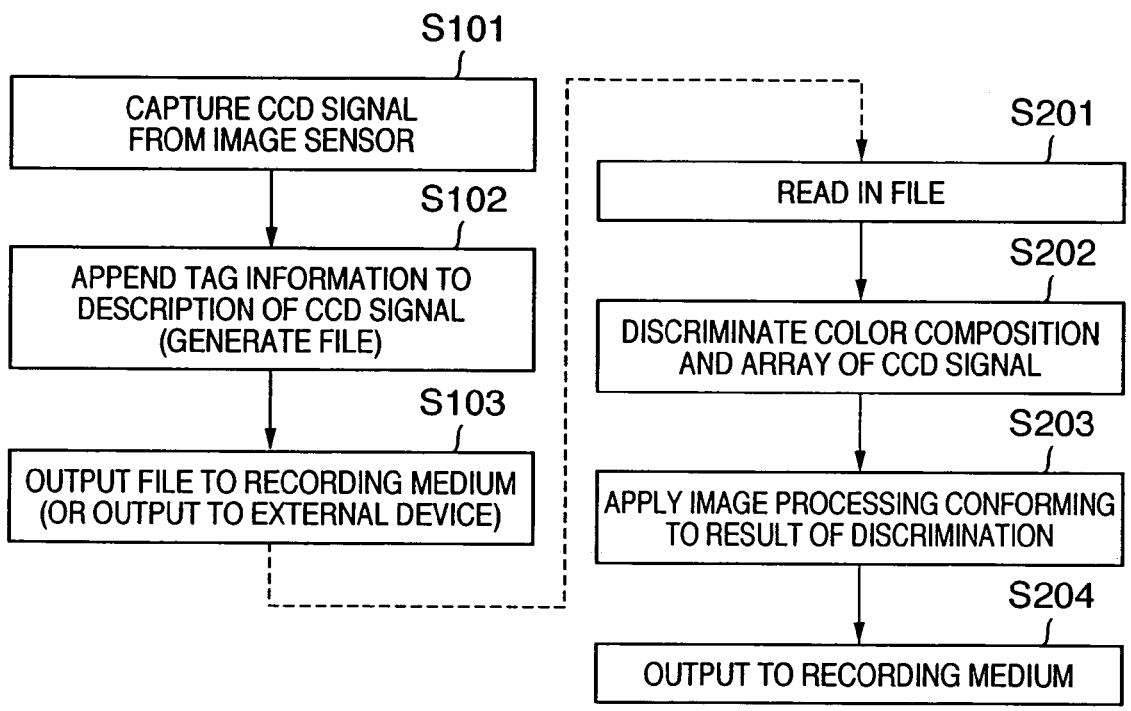
FIG. 13 is a flowchart illustrating the operation of an image sensing apparatus and information processing apparatus according to the first embodiment.
Figure 14:
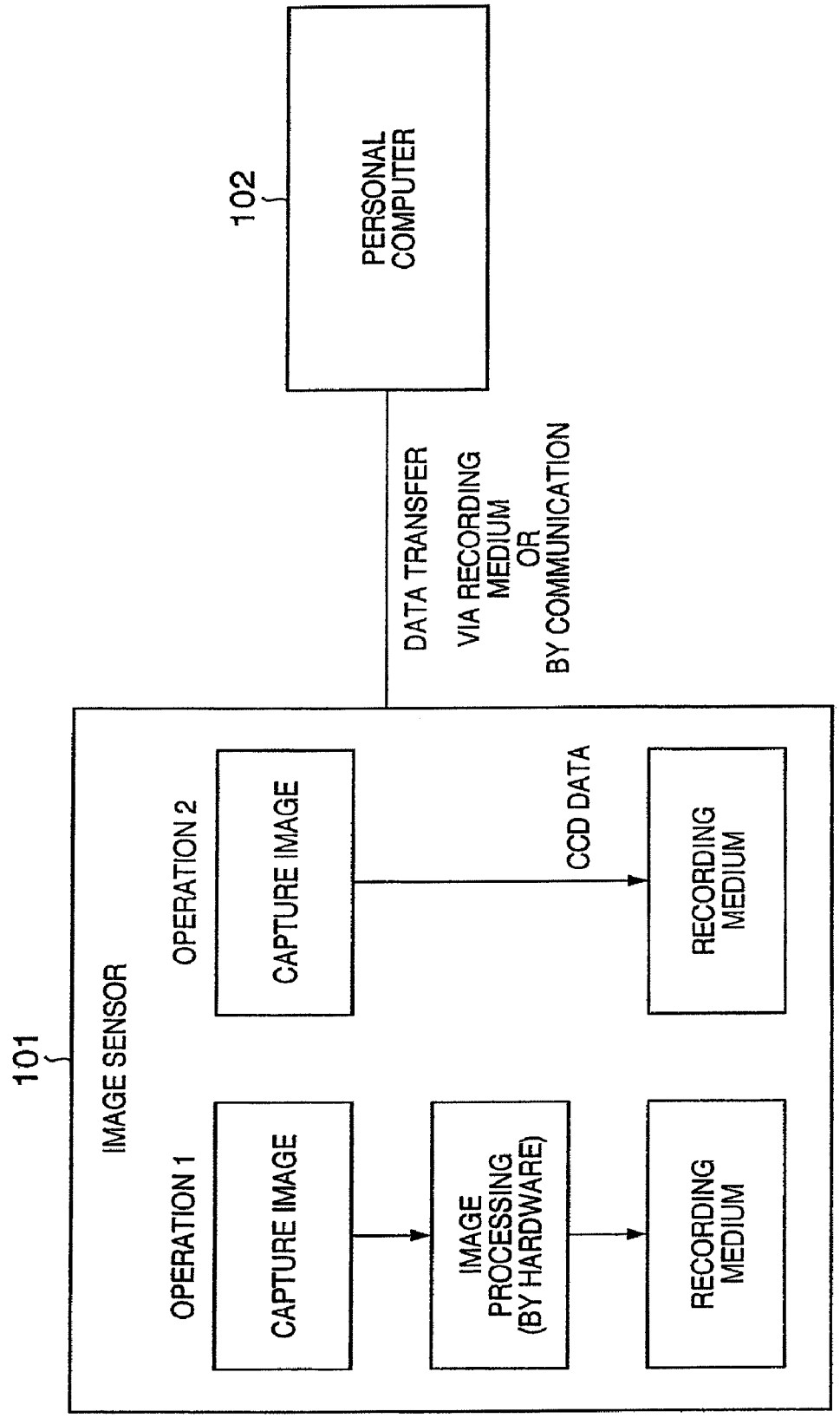
FIG. 14 is a conceptual view illustrating image processing for reproducing CCD data according to the prior art.

FIG. 13 is a flowchart for describing an overview of image processing executed by the information processing apparatus 12 using the signal processing method according to this embodiment. Steps S101 to S103 in FIG. 13 illustrate the operation of the image sensing apparatus 11, and step S201 to S204 show the operation of the information processing apparatus 12. Specifically, imaging is performed by the image sensor 111 to acquire a CCD signal at step S101. Next, at step S102, the file generator 112 generates data that describes the CCD signal acquired from the image sensor 111 and adds tag information (described later) onto this data to thereby generate a file. This is followed by step S103, at which the file generated at step S102 is supplied to the recording unit 113 and recorded on a prescribed recording medium. Alternatively, in response to a request from an external device (the information processing apparatus 12 in this embodiment), the output unit 114 outputs a file that has been recorded on the recording unit 113.

Upon accepting a file thus generated, the information processing apparatus 12 stores the file in the external storage device 127 or RAM 123 temporarily. The control program for implementing the image processing of this embodiment has been stored in the external storage device. The program in loaded into the RAM 123 and executed by the CPU 121 as necessary.

When image processing according to this embodiment is executed, a file to be processed is read into the RAM 123 from the external storage device 127 at step S201. The file may be read in from the media drive 128 or from the image sensing apparatus 11 via the interface 124. Next, at step S202, this file is analyzed and the color composition or array of the CCD signal (whether the CCD signal is a primary-color CCD signal or complementary-color CCD signal according to this embodiment) is discriminated. This is followed by step S203, at which appropriate image processing is selected in accordance with the color composition or array of the CCD signal discriminated at step S202, the CCD signal is processed and undergoes a conversion to the format of ordinary image data. The data resulting from the format conversion is stored on a recording medium (the external storage device 127 or media drive 128) at step S204.

Figure 2:
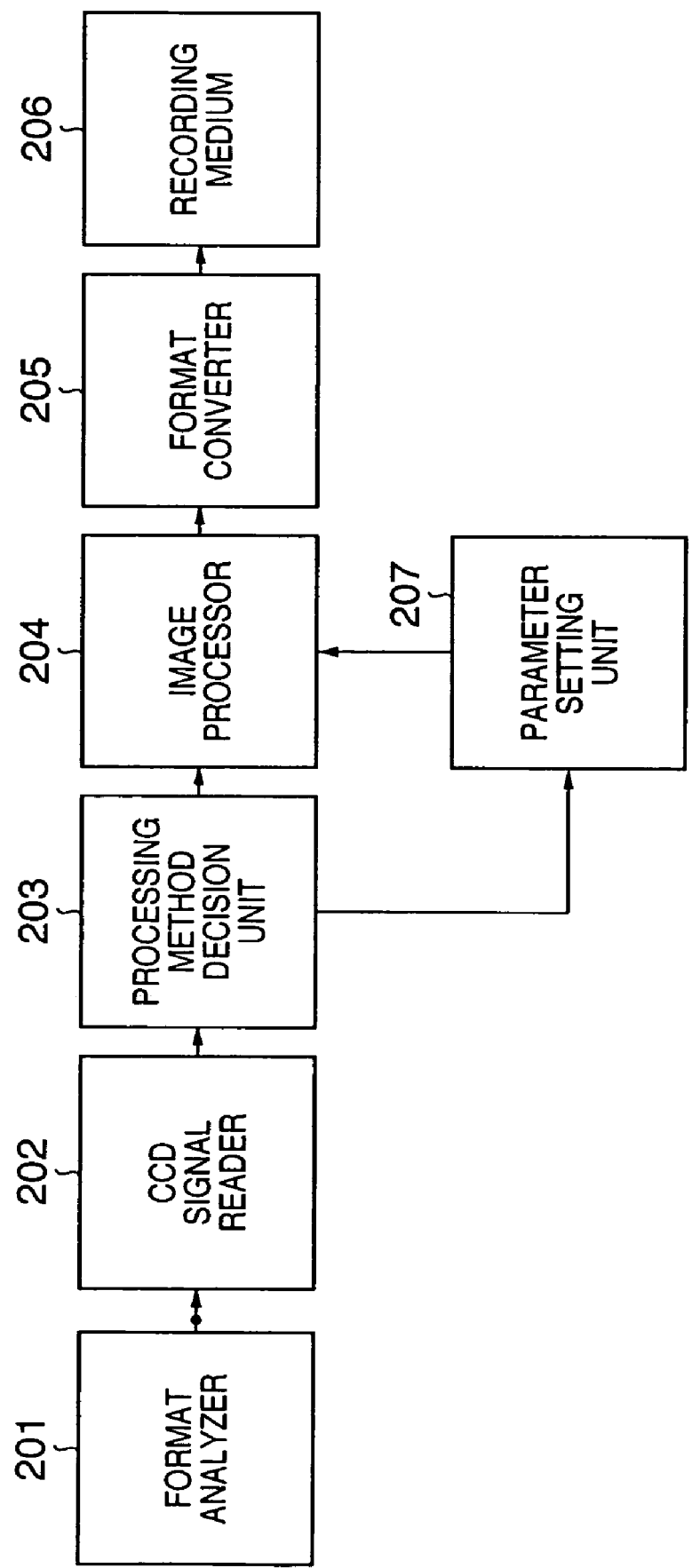
FIG. 2 is a block diagram illustrating an overview of image processing executed by an image processing apparatus according to the first embodiment.

FIG. 2 is a block diagram useful in describing a functional arrangement for implementing the foregoing image processing (steps S202 to S204) in the information processing apparatus 12 of the first embodiment. The flow of data in image processing according to this embodiment will be described with reference to FIG. 2.

File data that describes a CCD signal is analyzed by a format analyzer 201. More specifically, information indicating the number of pixels of the CCD that generated this CCD signal, photographic conditions and product information (product name contained in the tag information) for identifying the product are read in by the format analyzer 201.

FIG. 7 is a diagram illustrating an example of the data structure of a file used in this embodiment. A product name contained in tag information 702 is read out as product information by the format analyzer 201. The product name that has been read out is compared by the format analyzer 201 with a product list in which product names and characteristics of cameras having these product names are arranged in corresponding form, whereby it is determined whether the product is a camera that uses a primary-color CCD or a camera that uses a complementary-color CCD. Though the product name is adopted as the product information is this embodiment, a combination of product name and manufacturer name may also be adopted as the product information. It should be noted that the product list is stored in the external storage device 127, etc., beforehand and is loaded into the RAM 123 and referred to as necessary. The CCD signal is described in image data 703.

A CCD signal reader 202 reads the CCD signal from the file data on the basis of the information that has been read out by the format analyzer 201. The CCD signal reader 202 is capable of executing various types of decompression processing. By way of example, the CCD signal reader 202 reads compression format information from the tag information in the file obtained by the format analyzer 201, decides the decompression format in accordance with the compression format information, reads out the CCD signal and then decompresses the signal.

The result of the determination made by the format analyzer 201 based upon the product information as to whether the camera is a camera using a primary-color CCD or a camera using a complementary-color CCD indicates whether the CCD signal that has been read by the CCD signal reader 202 is a primary-color CCD signal or a complementary-color CCD signal. On the basis of the result of the determination made by the format analyzer 201, a processing method decision unit 203 decides the image processing to be used in an image processor 204, which is the next stage, and supplies this to the image processor 204 as processing selection information. The processing method decision unit 203, which holds a table or the like in which results of determinations and image processing methods are arranged in corresponding form, outputs the processing selection information by referring to this table. As a result, image processing can be changed over based upon the type of CCD signal (in this embodiment, whether the signal is a primary-color CCD signal or a complementary-color CCD signal).

The CCD signal that has been read by the CCD signal reader 202 is sent to the image processor 204. On the basis of a parameter set by a parameter setting unit 207, the image processor 204 subjects the CCD signal to the processing that has been selected by the processing method decision unit 203. The parameter setting unit 207 provides the image processor 204 with a parameter that conforms to the processing method decided. Further, since the setting of the parameter in the parameter setting unit 207 can be changed depending upon user preference, it is possible to set a parameter such as white balance, color density, hue, intensity of edge emphasis and contrast. For example, in a change of parameter by the user, the parameter that has been selected in accordance with the processing method is adopted as the default value and an increase or decrease can be applied based upon a value set by the user. The output image signal that has been processed by the image processor 204 is subjected to a format conversion by a format converter 205 so as to be converted to the JPEG format, TIFF format or BMP format, etc., and the resulting signal is written to the recording medium by an output unit 206.

Figure 3:
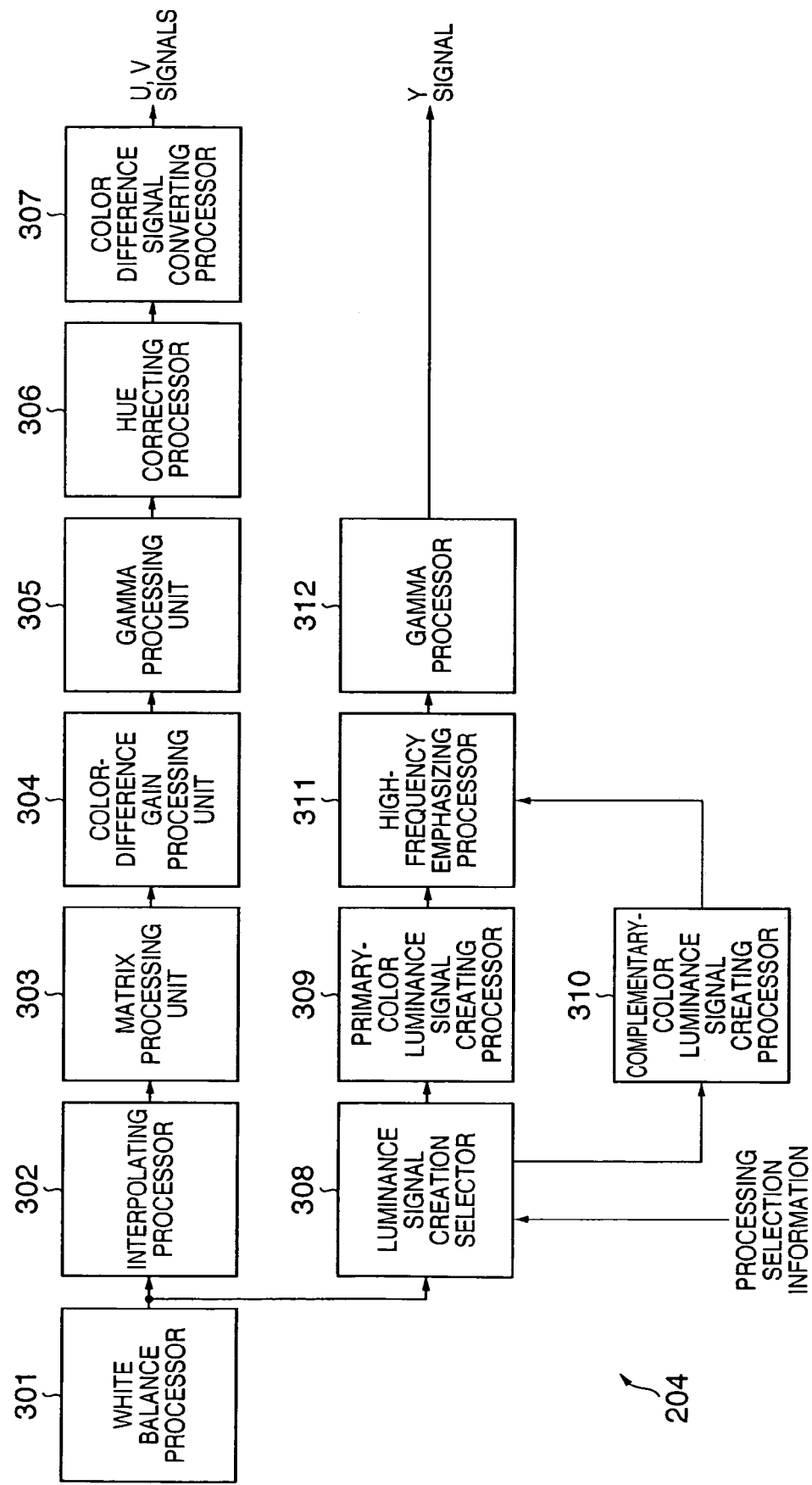
FIG. 3 is a block diagram illustrating the structure of an image processing unit according to the first embodiment.

The details of the image processor 204 will be described next. FIG. 3 is a block diagram useful in describing the details of processing included in processing executed by the image processor 204. The flow of image processing in the image processor 204 will be described with reference to the block diagram of FIG. 3.

The CCD signal that has entered from the CCD signal reader 202 is sent first to a white balance processor 301, where white balance coefficients and color temperature of the light source that will cause white in the image to become a white signal are obtained. White balance processing is executed in such a manner that white in the image that is the result of applying the white balance coefficients to the CCD signal will become a white signal. The CCD signal that has been subjected to the white balance processing is sent to a U, V signal (color difference signal) generating channel (also referred to as a "color signal generating channel", which is composed of units from an interpolating processor 302 to a color difference signal converting processor 307) and to a Y signal (luminance signal) generating channel (composed of units from a luminance signal creation selector 308 to a gamma processor 312).

The U, V signal generating channel will be described first. Using pixel values at positions A, B, C, D from the pixel array of a single-chip CCD, the interpolating processor 302 generates field data of A, B, C, D signals by an interpolating operation. For example, we have (A,B,C,D)=(R,G1,G2,B) in case of a primary-color CCD signal in FIG. 4, and we have (A,B,C,D)=(C,M,Y,G) in case of a complementary-color CCD signal in FIG. 5. A matrix calculation unit 303 performs a color conversion pixel by pixel using Equation (1) below. It should be noted that the matrix elements M11 to M43 in Equation (1) are changed and set by the parameter setting unit 207 in dependence upon the processing method (processing for a primary-color CCD signal or processing for a complementary-color CCD signal in this embodiment) decided by the processing method decision unit 203.

$$\begin{bmatrix} Rm \\ Gm \\ Bm \end{bmatrix} = \begin{bmatrix} M11 & M21 & M31 & M41 \\ M12 & M22 & M32 & M42 \\ M13 & M23 & M33 & M43 \end{bmatrix} \begin{bmatrix} A \\ B \\ C \\ D \end{bmatrix} \quad (1)$$

The CCD signal that has undergone the color conversion to Rm, Gm, Bm by the matrix processor 303 is input to a color-difference gain processor 304. The latter acquires a luminance signal Y and color difference signals Cr, Cb from the entered CCD signal, multiplies the color difference signals by a gain to generate Cr', Cb' and converts Y, Cr', Cb' again to signals in RGB color space. More specifically, the color-difference gain processor 304 first converts the Rm, Gm, Bm signals to Y, Cr, Cb signals by Equation (2) below, multiplies the Cr, Cb signals by gain in accordance with Equation (3) below, and converts the Y, Cr', Cb' obtained to Rg, Gg, Bg signals according to Equation (4) [which is a matrix that is the inverse of the matrix of Equation (2)]. It should be noted that the gain coefficient G1 in Equation (3) is changed and set by the parameter setting unit 207 in dependence upon the processing method decided by the processing method decision unit 203, namely processing for the primary-color CCD signal or processing for the complementary-color signal.

$$\begin{bmatrix} Y \\ Cr \\ Cb \end{bmatrix} = \begin{bmatrix} 0.3 & 0.59 & 0.11 \\ 0.7 & -059 & -0.11 \\ -0.3 & -0.59 & 0.89 \end{bmatrix} \begin{bmatrix} Rm \\ Gm \\ Bm \end{bmatrix} \quad (2)$$

$$Cr' = G1 \times Cr \quad (3)$$
$$Cb' = G1 \times Cb$$

$$\begin{bmatrix} Rg \\ Gg \\ Bg \end{bmatrix} = \begin{bmatrix} 0.3 & 0.59 & 0.11 \\ 0.7 & -059 & -0.11 \\ -0.3 & -0.59 & 0.89 \end{bmatrix}^{-1} \begin{bmatrix} Y \\ Cr' \\ Cb' \end{bmatrix} \quad (4)$$

The CCD signal obtained by the color-difference gain processor 304 is sent to a gamma processor 305. The latter converts the entered CCD signal to data using the following Equations (5) to (7):

$$Rt = \text{GammaTable}[Rg] \quad (5)$$

$$Gt = \text{GammaTable}[Gg] \quad (6)$$

$$Bt = \text{GammaTable}[Bg] \quad (7)$$

where GammaTable in the above equations represents a one-dimensional look-up table (i.e., a gamma table). The gamma table is changed and set by the parameter setting unit 207 in dependence upon the processing method decided by the processing method decision unit 203.

Next, the CCD signal that has undergone the gamma correction is sent to a hue correcting processor 306. The latter first converts the Rh, Gh, Bh signals obtained by the gamma processor 305 to Y, Cr, Cb signals by Equation (8) below and then subjects Cr, Cb to a signal correction by Equation (9) below and effects a conversion to Rt, Gt, Bt signals according to Equation (10) [which is a matrix that is the inverse of the matrix of Equation (9)]. The matrix elements H11 to H22 in Equation (9) (where H signifies the hue) are changed and set by the parameter setting unit 207 in dependence upon the processing method processing for a primary-color CCD signal or processing for a complementary-color CCD signal in this embodiment) decided by the processing method decision unit 203.

$$\begin{bmatrix} Y \\ Cr \\ Cb \end{bmatrix} = \begin{bmatrix} 0.3 & 0.59 & 0.11 \\ 0.7 & -059 & -0.11 \\ -0.3 & -0.59 & 0.89 \end{bmatrix} \begin{bmatrix} Rt \\ Gt \\ Bt \end{bmatrix} \quad (8)$$

$$\begin{bmatrix} Cr' \\ Cb' \end{bmatrix} = \begin{bmatrix} H11 & H21 \\ H12 & H22 \end{bmatrix} \begin{bmatrix} Cr \\ Cb \end{bmatrix} \quad (9)$$

$$\begin{bmatrix} Rh \\ Gh \\ Bh \end{bmatrix} = \begin{bmatrix} 0.3 & 0.59 & 0.11 \\ 0.7 & -0.59 & -0.11 \\ -0.3 & -0.59 & 0.89 \end{bmatrix}^{-1} \begin{bmatrix} Y \\ Cr' \\ Cb' \end{bmatrix} \quad (10)$$

The CCD signal (Rh, Gh, Bh) that has been output from the hue correcting processor 306 is sent to the color difference signal converting processor 307. The latter creates U, V signals from Rh, Gh, Bh using Equation (11) below. The color difference signals U, V are generated in the manner described above.

$$\begin{bmatrix} U \\ V \end{bmatrix} = \begin{bmatrix} -0.169 & -0.333 & 0.502 \\ 0.499 & -0.421 & -0.078 \end{bmatrix} \begin{bmatrix} Rh \\ Gh \\ Bh \end{bmatrix} \quad (11)$$

Meanwhile, the processing set forth below is executed in the channel for generating the luminance signal. The CCD signal that has undergone white balance processing is input to a primary-color luminance signal creating processor 309 or complementary-color luminance signal creating processor 310 by the luminance signal creation selector 308. That is, the luminance signal creation selector 308 decides the destination of the CCD signal in accordance with the processing selection information that enters from the processing method decision unit 203. As a result, the luminance signal is created by the primary-color luminance signal creating processor 309 in case of the primary-color CCD signal and the luminance signal is created by the complementary-color luminance signal creating processor 310 in case of the complementary-color CCD signal.

Figure 6:
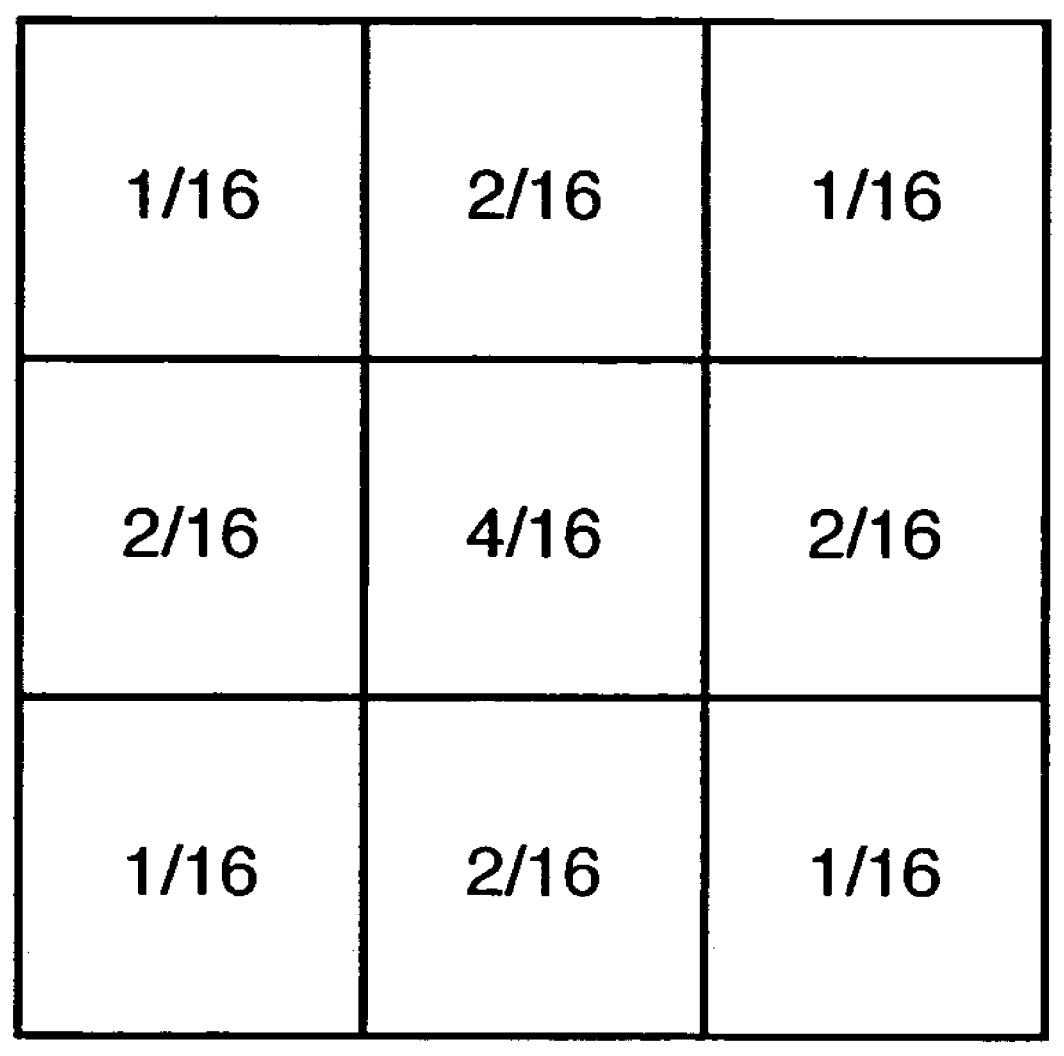
Figure 15:
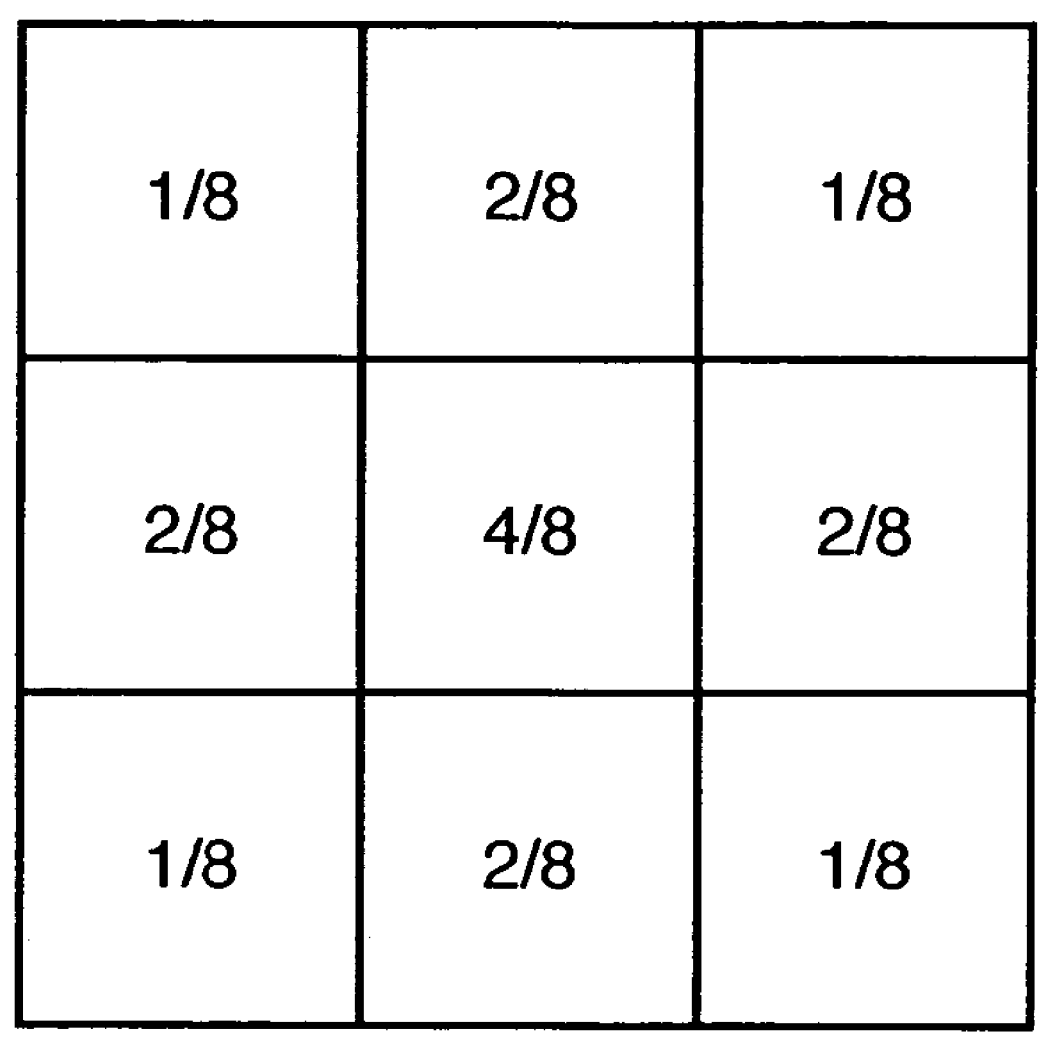

More specifically, the primary-color CCD signal of the kind shown in FIG. 4 is supplied to the primary-color luminance signal creating processor 309. The latter makes the R, B signals in the CCD all "0"s, applies two-dimensional filter processing having the coefficients shown in FIG. 15 and adopts the resulting signal as the luminance signal. FIG. 15 shows an interpolating filter for interpolating the G signal. On the other hand, the complementary-color CCD signal of the kind shown in FIG. 5 is supplied to the complementary-color luminance signal creating processor 310. The latter applies two-dimensional filter processing having the coefficients shown in FIG. 6 to the CCD signal (without subjecting the CCD signal to any other processing) and adopts the resulting signal as the luminance signal. FIG. 6 illustrates one type of low-pass filter.

The luminance signal created by the primary-color luminance signal creating processor 309 or complementary-color luminance signal creating processor 310 is subjected to edge emphasizing processing by a high-frequency emphasizing processor 311. Gamma correction processing is applied by the gamma processor 312 to thereby create the final Y signal. The gamma processor 312 is a gamma processor for the luminance signal.

It should be noted that parameters that can be changed by a user setting employing the parameter setting unit 207 are G1 in Equation (3), the table data in Equations (5) to (7) and, though these have not been described in this embodiment, the intensity of edge emphasis by the high-frequency emphasizing processor 311 and a table, etc., used in the gamma processor 312. The parameter that has been set by the user is stored in an internal memory (not shown) of the information processing apparatus or in an external storage device or recording medium, etc., together with the CCD signal. The parameter may be adopted as an initial value at the time of signal creation and can be used upon being read out when appropriate. Further, the parameter changed over depending upon the complementary-color CCD signal and primary-color CCD signal is one obtained by applying a user setting to a default value corresponding to the primary-color filter or complementary-color filter (i.e., a value set by the user is added to or subtracted from the default value), as indicated by G1 in Equation (3) or H11 to H22 in Equation (9). It should be noted that the input of the value set by the-user is made by the input panel 125 and a user interface presented by the display unit 126.

The foregoing is the flow of image processing according to the first embodiment. It should be noted that although the parameter setting unit 207 of FIG. 2 changes parameters in dependence upon the processing method decided by the processing method decision unit 203, this does not impose a limitation upon the invention. For example, it may be so arranged that parameters are decided based upon product information acquired by the format analyzer 201.

Further, in this embodiment, tag information in a file is analyzed by the format analyzer 201 of FIG. 2 and selection of the processing method in the image processor 204 is performed based upon the product information obtained. However, as shown in FIG. 8, it may be so arranged that in a case where CCD filter information indicating color information and color array of the CCD signal (color filter) is contained in tag information 802 of the file, the processing method of the image processor 204 is changed over based upon this CCD filter information [changeover of the color signal generating channel (based upon the parameter) and changeover of the processing unit in the luminance signal generating channel]. Further, though an arrangement having the primary-color luminance signal creating processor 309 and complementary-color luminance signal creating processor 310 has been illustrated as the luminance signal creating processor, this may be combined with a luminance signal creating processor that processes another type of CCD signal or the arrangement may-have three or more types of luminance signal creating processors. For example, it should be obvious from the description of the above embodiment that a plurality of types of signal processing may be provided, such as luminance signal creation processing supporting a primary-color filter and complementary-color filter of different arrays, a luminance signal creating processor supporting a 3-chip CCD signal described in a fourth embodiment, and a luminance signal creating processor supporting the output signal of an image sensing device of the type that separates color by a photoelectric transducer having a multilayer structure. It is of course possible to process these CCD signals by changing over parameters in the color signal generating channel.

Thus, in accordance with the first embodiment, as described above, there is provided a signal processing method for reading a CCD signal out of a file in which an output signal from a CCD is described in a camera-specific signal format, and converting this CCD signal to a standard signal. The method includes automatically selecting one type of luminance signal creation processing from at least two types of luminance signal creation processing prepared in advance by referring to tag information in the file, and effecting a conversion from the CCD signal to the luminance signal using a luminance signal that has been created by the luminance signal creation processing selected. Here the type of CCD signal can be discriminated by referring to a product name or CCD filter information contained in the tag information. As a result, the appropriate image processing is applied automatically in accordance with the type of CCD signal (e.g., the type of colors or array in the CCD signal, such as a complementary-color CCD signal or primary-color CCD signal) and the conversion to the standard signal is performed correctly.

Second Embodiment

A second embodiment of the present invention will be described with reference to FIG. 9. The configuration of the system and the essentials of processing in the image sensing apparatus 11 and information processing apparatus 12 of the second embodiment are similar to those of the first embodiment (FIGS. 1, 2 and 13). The structure and operation of the image processor 204 according to the second embodiment will now be described with reference to FIG. 9.

Figure 9:
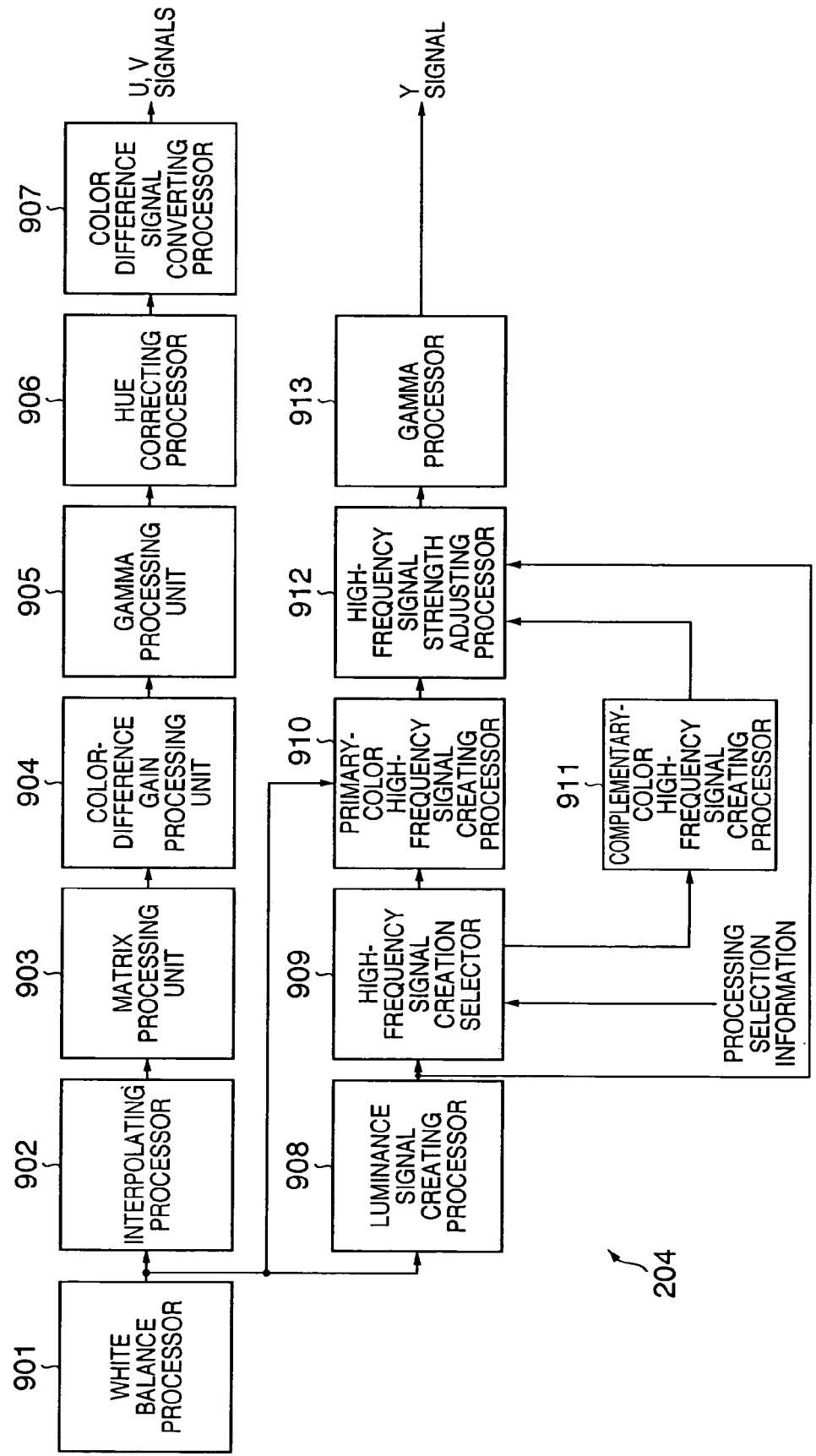
FIG. 9 is a block diagram illustrating the structure of an image processing unit according to a second embodiment of the present invention.

FIG. 9 is a block diagram useful in describing the structure of the image processor 204 according to the second embodiment. In FIG. 9, the structure of a white balance processor 901 and the structure of the U, V signal generating channel (from an interpolating processor 902 to a color difference signal converting processor 907) are similar to those of the first embodiment (from the interpolating processor 302 to the color difference signal converting processor 307).

Processing for generating the Y signal according to the second embodiment will be described. In the first embodiment, the luminance signal creating processor in the luminance signal generating channel is changed over in dependence upon the type of CCD signal. In the second embodiment, however, high-frequency emphasizing processing for edge emphasis in the luminance signal generating channel is changed over in dependence upon the type of CCD signal.

In FIG. 9, the CCD signal that has undergone white balance processing is sent to a luminance signal creating processor 908, which proceeds to execute processing for lowering the frequency band using the filter coefficients of FIG. 6. The luminance signal thus created is sent to a high-frequency signal strength adjusting processor 912, which is the next stage. Next, in accordance with the processing selection information from the processing method decision unit 203, a high-frequency signal creation selector 909 selects a primary-color high-frequency signal creating processor 910 or a complementary-color high-frequency signal creating processor 911 as the destination for supply of the CCD signal that enters from the luminance signal creating processor 908. That is, the processing method for creating a high-frequency signal with regard to the CCD signal is selected by the processing selection information decided based upon the product information. As a result, the high-frequency signal is created using the primary-color high-frequency signal creating processor 910 in the case of the primary-color CCD signal (FIG. 4) and using the complementary-color high-frequency signal creating processor 911 in the case of the complementary-color CCD signal (FIG. 5).

The primary-color high-frequency signal creating processor 910 reads in the CCD signal that has been subjected to white balance processing by the white balance processor 901, makes the values at the pixel positions of the R, B signals "0", executes filter processing using the filter shown in FIG. 15 based upon the G1, G2 signals and creates a G interpolation signal. The primary-color high-frequency signal creating processor 910 further subjects the G interpolation signal to [−1, 0, 2, 0, −1] filter processing in the horizontal direction and [−1, 0, 2, 0, −1] filter processing in the vertical direction, thereby creating a high-frequency signal.

Further, the complementary-color high-frequency signal creating processor 911 subjects the luminance signal, which has been sent from the luminance signal creating processor 908, to [−1, 0, 2, 0, −1] filter processing in the horizontal direction and [−1, 0, 2, 0, −1] filter processing in the vertical direction, thereby creating a high-frequency signal.

The high-frequency signal created by the primary-color high-frequency signal creating processor 910 or complementary-color high-frequency signal creating processor 911 has its intensity adjusted by a gain operation in the high-frequency signal strength adjusting processor 912, which then proceeds to add the resultant signal to the luminance signal created by the luminance signal creating processor 908. The luminance signal to which the high-frequency signal has been added undergoes a gamma conversion in a gamma processor 913, whereby the Y signal is created.

Thus, in accordance with the method of the second embodiment, the method includes automatically selecting one type of high-frequency emphasis signal creation processing from at least two types of high-frequency emphasis signal creation processing prepared in advance, and generating a luminance signal that has been subjected to the high-frequency emphasis signal creation processing selected. As a result, the appropriate image processing is applied automatically in accordance with the type of CCD signal and the conversion to the standard signal is performed correctly.

Third Embodiment

In the first embodiment, signal processing in a luminance signal creating processor differs depending upon whether the CCD signal is a primary-color CCD signal or a complementary-color CCD signal. In the second embodiment, signal processing in a high-frequency emphasis signal creating processor differs depending upon whether the CCD signal is a primary-color CCD signal or a complementary-color CCD signal. In a third embodiment, both luminance signal creation and high-frequency emphasizing processing are changed over depending upon whether the CCD signal is a primary-color CCD signal or a complementary-color CCD signal.

Figure 10:
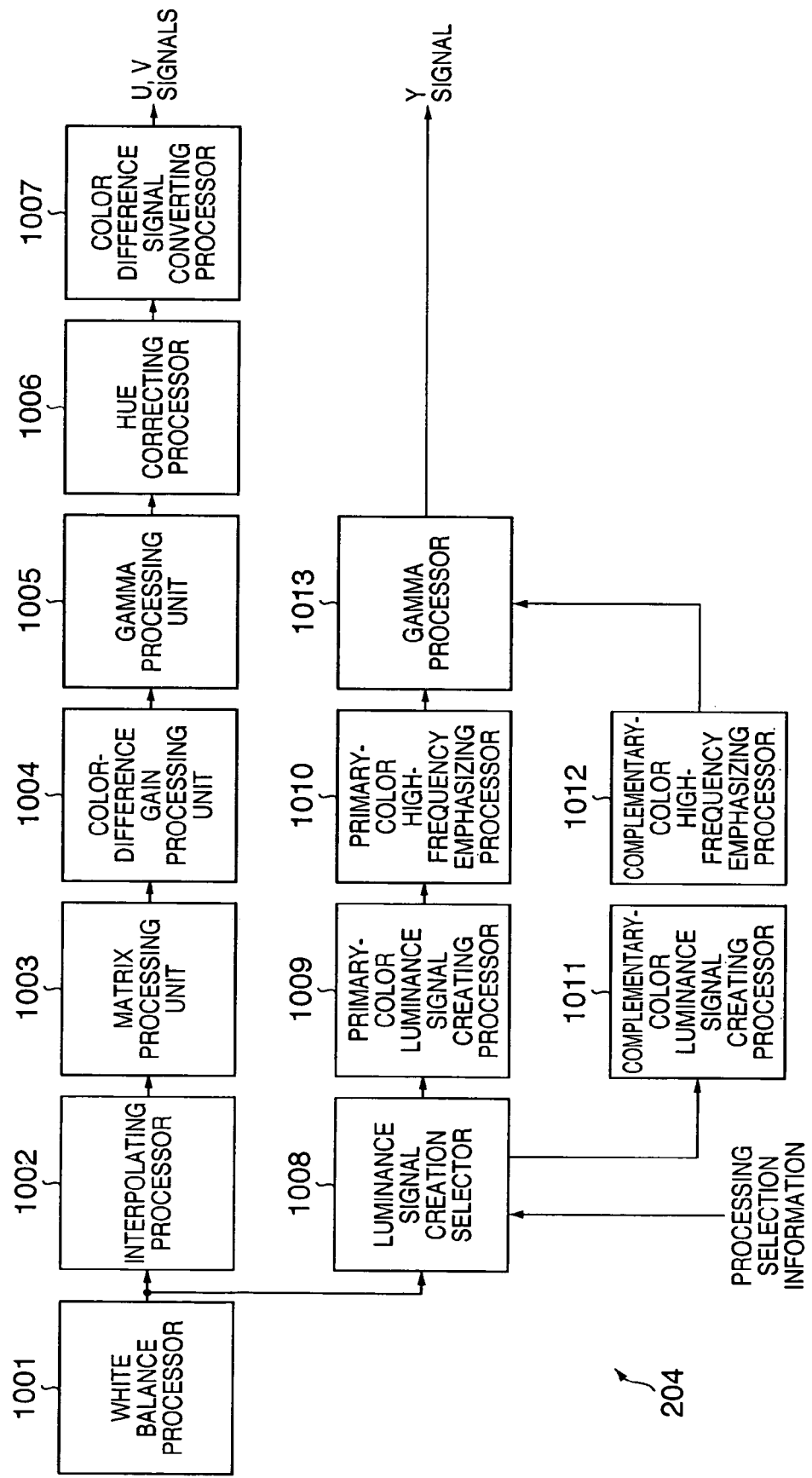
FIG. 10 is a block diagram illustrating the structure of an image processing unit according to a third embodiment of the present invention.

FIG. 10 is a block diagram useful in describing the structure of the image processor 204 according to the third embodiment. In FIG. 10, the structure of a white balance processor 1001 and the structure of the U, V signal generating channel (from an interpolating processor 1002 to a color difference signal converting processor 1007) are similar to those of the first embodiment (from the interpolating processor 302 to the color difference signal converting processor 307).

Further, a luminance signal creation selector 1008, primary-color luminance signal creating processor 1009 and complementary-color luminance signal creating processor 1011 have functions identical with those of the luminance signal creation selector 308, primary-color luminance signal creating processor 309 and complementary-color luminance signal creating processor 310, respectively, of the first embodiment.

The luminance signal generated by the primary-color luminance signal creating processor 1009 undergoes high-frequency emphasis in a primary-color high-frequency emphasizing processor 1010. On the other hand, the luminance signal generated by the complementary-color luminance signal creating processor 1011 undergoes high-frequency emphasis in a complementary-color high-frequency emphasizing processor 1012. It should be noted that the primary-color high-frequency emphasizing processor 1010 has functions identical with those of an arrangement obtained by combining the primary-color high-frequency signal creating processor 910 and high-frequency signal strength adjusting processor 912 of the second embodiment. Similarly, the complementary-color high-frequency emphasizing processor 1012 has functions identical with those of an arrangement obtained by combining the complementary-color high-frequency signal creating processor 911 and high-frequency signal strength adjusting processor 912 of the second embodiment.

The luminance signal whose high frequency has thus been emphasized is subjected to a gamma conversion in a gamma processor 1013, whereby the Y signal is created.

Fourth Embodiment

In a fourth embodiment of the present invention, it is possible to appropriately process a CCD signal obtained via a primary-color filter of a single-chip Bayer array of the kind shown in FIG. 4 (this signal shall be referred to as a "Bayer CCD signal" in this embodiment) and a CCD signal obtained by a 3-chip CCD of the kind shown in FIG. 12 (this signal shall be referred to as a "3-chip CCD signal" in this embodiment).

The configuration of the system and the essentials of processing in the image sensing apparatus 11 and information processing apparatus 12 of the fourth embodiment are similar to those of the first embodiment (FIGS. 1, 2 and 13). The structure and operation of the image processor 204 according to the fourth embodiment will now be described with reference to FIG. 11.

When file data is supplied to the format analyzer 201, the latter analyzes the tag information contained in the file. More specifically, information indicating the number of pixels of the CCD, photographic conditions and product information for identifying the product are read in by the format analyzer 201. The CCD signal is read out by the CCD signal reader 202 based upon the information read out by the format analyzer 201. Next, on the basis of file array information of the CCD read out by the format analyzer 201, the processing method decision unit 203 determines whether the CCD signal read out by the CCD signal reader 202 is the Bayer CCD signal or the 3-chip CCD signal and generates processing selection information for deciding the processing executed in the image processor 204.

Figure 11:
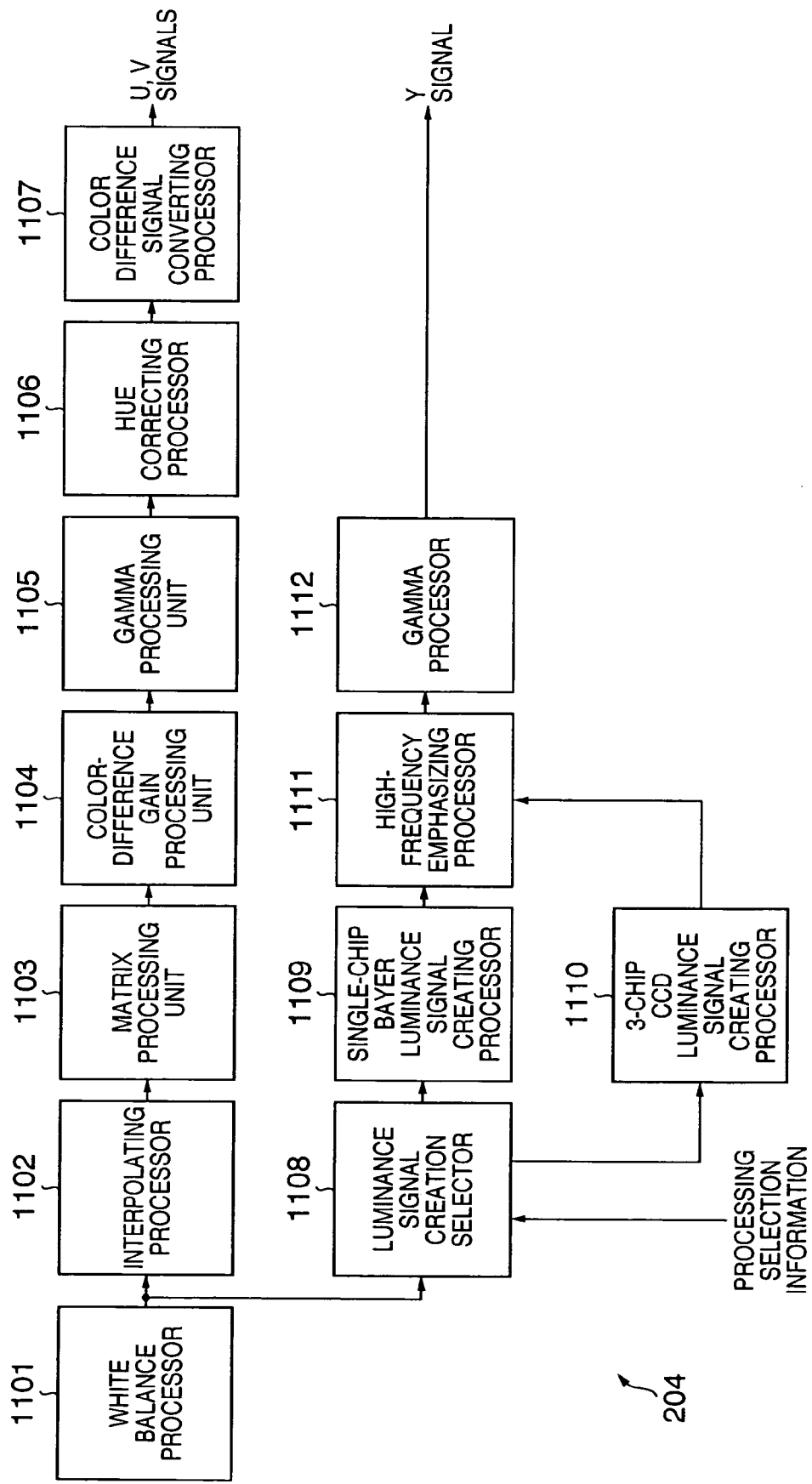
FIG. 11 is a block diagram illustrating the structure of an image processing unit according to a fourth embodiment of the present invention.

FIG. 11 is a block diagram useful in describing the structure of the image processor 204 according to the fourth embodiment. In FIG. 11, the structure of a white balance processor 1101 and the structure of the U, V signal generating channel (an interpolating processor 1102 to a color difference signal converting processor 1107) are similar to those of the first embodiment (the interpolating processor 302 to the color difference signal converting processor 307).

The CCD signal that has undergone white balance processing is supplied to either a single-chip Bayer luminance signal creating processor 1109 or 3-chip CCD luminance signal creating processor 1110 by a luminance signal creation selector 1108 based upon the processing selection information. The 3-chip CCD luminance signal creating processor 1110 generates a luminance signal using color signals of all colors contained in the CCD signal (digital image data). Further, the single-chip Bayer luminance signal creating processor 1109 generates a luminance signal, of the kind described in the first to third embodiments, using a color signal of a specific color contained in the CCD signal (digital image data). The Bayer CCD signal is sent to the single-chip Bayer luminance signal creating processor 1109, which proceeds to create a luminance signal. On the other hand, the 3-chip CCD signal is sent to the 3-chip CCD luminance signal creating processor 1110, which creates a luminance signal.

The Bayer CCD signal is identical with the primary-color CCD signal of the first embodiment. Accordingly, processing for creating the single-chip Bayer luminance signal is the same as processing used in the primary-color luminance signal creating processor of the first embodiment and need not be described here.

The 3-chip CCD luminance signal creating processor 1110 creates the luminance signal of the 3-chip CCD signal of the kind shown in FIG. 12 in accordance with Equation (12) below.

$$Y = 0.33 \times R + 0.69 \times G + 0.11 B \quad (12)$$

The luminance signal created by the single-chip Bayer luminance signal creating processor 1109 or 3-chip CCD luminance signal creating processor 1110 has its edge component emphasized by a high-frequency emphasizing processor 1111 and is further subjected to gamma conversion processing by a gamma processor 1112, whereby the final Y signal is generated.

Thus, in accordance with the fourth embodiment, processing for creating a luminance signal can be changed over upon distinguishing between a single-chip primary-color CCD signal and a 3-chip primary-color CCD signal. It should be noted that the changeover in processing for creating the luminance signal in the fourth embodiment may be achieved in combination with the first or third embodiment. Furthermore, in a case where the invention is applied to the third embodiment, it is assumed that the 3-chip CCD signal and primary-color CCD signal (Bayer CCD signal) are both processed by the primary-color high-frequency emphasizing processor 1010. It is of course possible to combine the complementary-color CCD signal as the single-chip CCD signal. For example, in a case where the arrangement of the third embodiment is employed in this combination, the 3-chip CCD signal is processed by the primary-color high-frequency emphasizing processor 1010 and the complementary-color CCD signal is processed by the complementary-color luminance signal creating processor 1011.

Fifth Embodiment

In the first embodiment, information contained in a file is analyzed by the format analyzer 201. More specifically, information indicating the number of pixels of the CCD, photographic conditions and product information for identifying the product are read in by the format analyzer 201. The CCD signal is read out by the CCD signal reader 202 based upon the information read out by the format analyzer 201. In a fifth embodiment, a file extension is read out by the format analyzer 201 and, in accordance with the extension, the CCD signal reader 202 determines the processing for generating the luminance signal in the image processor 204 (luminance signal processing conforming to the primary-color CCD signal or complementary-color CCD signal) and the processing for decompressing a compressed file.

Figure 16:
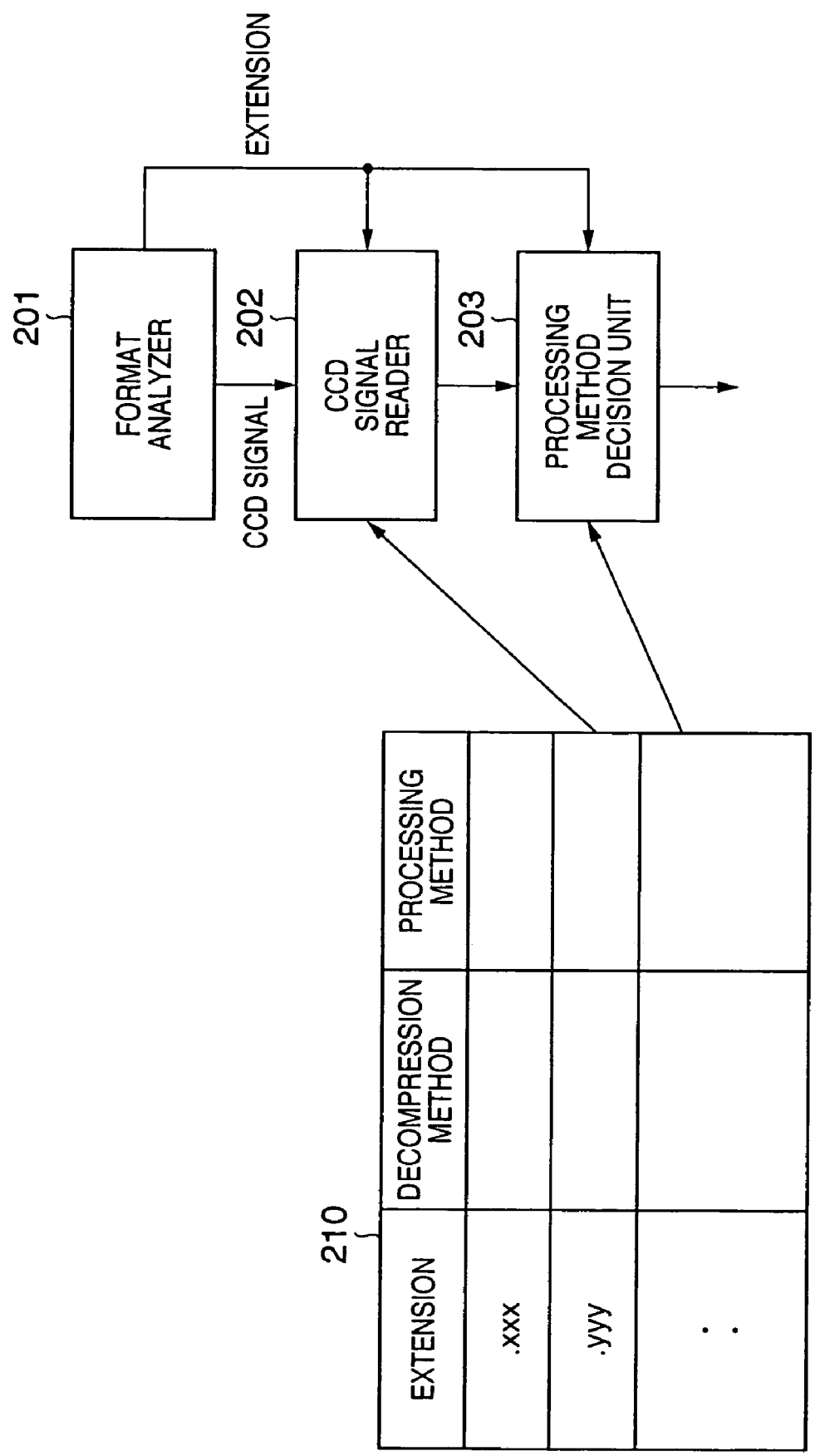
FIG. 16 is a diagram useful in describing utilization of a table that correlates extensions and processing methods.

An arrangement of the kind shown in FIG. 16 is furnished in order to change over processing automatically in accordance with the extension of the file data. Specifically, it will suffice if signal processing (decompression method and processing method) corresponding to each of a plurality of extensions of file data are retained in the form of a table 210. The CCD signal reader 202 acquires data indicating the extension from the format analyzer 201, refers to the table 210 and then selects the decompression method. Similarly, the processing method decision unit 203 acquires data indicating the extension from the format analyzer 201, refers to the table 210 and then decides the processing method. Further, it may be so arranged that an extension list (table) storing extensions of files capable of being processed is retained and whether entered file data can be processed or not is discriminated by referring to this table.

It may so arranged that more detailed signal processing is discriminated by combining tag information along with the file data extensions. Alternatively, it may be so arranged that in the event of input of a file having an extension not contained in a table holding the extensions of files capable of being processed, signal processing is changed over using tag information possessed by the file data. Further, it should be obvious that it is permissible to adopt an arrangement in which processing for decompressing compressed data is decided based upon tag information (product name, etc.).

Further, embodiments in which captured digital image data and tag information are integrated have been described. However, if conditions are such that items of digital image data and tag information are linked, these may just as well be stored as separate files.

Thus, in accordance with each of the embodiments as described above, if image processing is necessary in order to change the format of data having a manufacturer-specific format to a standard format, it is possible to make the change to the optimum standard format automatically without mistaking the image processing method.

In accordance with the present invention, as described above, even a novice is capable of applying appropriate image processing to data that includes reversibly compressed or non-compressed digital image data obtained by digitally converting a signal that is output from an image sensing device, and it is possible to facilitate operation by the user.

Other Embodiments

It may be so arranged that the functions described in the foregoing embodiments are implemented in an image sensing apparatus. In such case a removable recording medium on which image data obtained by photography using another camera has been recorded is loaded in the apparatus, the image data is read out of the recording medium, the processing of the above-described embodiments is applied to the image data to convert it to image data having a prescribed format, and the resulting image data is recorded on a recording medium or is output externally.

Further, in the foregoing embodiments, the arrangement is such that a known image processing method is decided in the processing method decision unit 203 with respect to product information or the like. However, in may be so arranged that in a case where product information is so new that there is no corresponding image processing method in the reference table, the closest image processing method is selected judging from the version of the product information or the name of the manufacturer.

Further, product information has been described with regard to files that can be analyzed. However, it may be so arranged that in a case where a format cannot be read and an extension or file tag information per se cannot be analyzed, an error display is presented to the user and processing of latter stages is halted automatically so that needless processing will not be executed.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing method for processing a file containing lossless-compressed or non-compressed digital image data obtained by digitally converting a signal that has been output from an image sensing device, said method including process of:

reading the digital image data contained in the file;

selecting automatically signal processing to be used from among a plurality of types of signal processing which use any of at least a plurality of types of luminance signal processing methods and/or a plurality of types of color signal processing methods based upon an extension indicating a format of the file to be processed;

further selecting, when the signal processing cannot be selected based on the extension of the file at the selecting step, the signal processing based on specific information of an image sensing apparatus including product information specifying an apparatus that generates the file, configuration of the image sensing device that generates the file and color-filter information specifying a color filter used by the image sensing device that are contained in the file; and converting the digital image data contained in the file to data having a prescribed format by executing the selected signal processing.

2. The method according to claim 1, further comprising a decompression execution process of subjecting the digital image data contained in the file to one of a plurality of decompressing processes corresponding to a plurality of types for decompressing digital image data;

wherein in the selecting process, decompression process to be used in the decompression execution process is selected based upon the attribute information contained in the file.

3. The method according to claim 1, wherein the signal processing is executed in the converting process using an image processing parameter set by a user.

4. The method according to claim 1, wherein signal processing of the plurality of types in the converting process includes high-frequency emphasis processing for causing a high-frequency emphasis signal to act upon a luminance signal that has been obtained by conversion from the digital image data, said high-frequency emphasis signal being obtained by either first processing for generating a high-frequency emphasis signal using color signals of all colors included in the digital image data, or second processing for generating a high-frequency emphasis signal using a color signal of a specific color included in the digital image data, wherein signal processing of the plurality of types in the converting process further includes third processing for generating a luminance signal using color signals of all colors included in the digital image data, and fourth processing for generating a luminance signal using a color signal of a specific color included in the digital image data; and in the selecting process, either the third processing or the fourth processing is further selected.

5. A computer readable storage medium storing a control program causing a computer to execute the information processing method set forth in claim 1.

6. A control program stored in a computer readable storage medium, which causes a computer to execute the information processing method set forth in claim 1.

7. An information processing apparatus for processing a file containing lossless-compressed or non-compressed digital image data obtained by digitally converting a signal that has been output from an image sensing device, said apparatus comprising:

a reading unit configured to read the digital image data contained in the file;

a first selecting unit configured to select automatically signal processing to be used from among a plurality of types of signal processing which use any of at least a plurality of types of luminance signal processing methods and/or a plurality of types of color signal processing methods based upon an extension indicating a format of the file to be processed;

a second selecting unit, when the signal processing cannot be selected based on the extension of the file by said first selecting unit, configured to select the signal processing based on specific information of an image sensing apparatus including product information specifying an apparatus that generates the file, configuration of the image sensing device that generates the file and color-filter information specifying a color filter used by the image sensing device that are contained in the file; and a converting unit configured to convert the digital image data contained in the file to data having a prescribed format by executing the selected signal processing.

* * * * *